(12) United States Patent
Queveau et al.

(10) Patent No.: US 6,357,815 B1
(45) Date of Patent: Mar. 19, 2002

(54) TRUNK LID FOR CONVERTIBLE VEHICLE WITH FOLDING ROOF

(75) Inventors: Gérard Queveau; Paul Queveau; Jean-Marc Guillez, all of Cerizay (FR)

(73) Assignee: France Design, Cerizay (FR)

( * ) Notice: Subject to any disclaimer, the term of this patent is extended or adjusted under 35 U.S.C. 154(b) by 0 days.

(21) Appl. No.: 09/288,996

(22) Filed: Apr. 9, 1999

(30) Foreign Application Priority Data

Apr. 9, 1998 (FR) .............................................. 98 04478

(51) Int. Cl.⁷ .............................. B62D 25/10; B60J 7/20
(52) U.S. Cl. ...................................... 296/76; 296/107.08
(58) Field of Search ...................... 296/76, 136, 107.08, 296/116

(56) References Cited

U.S. PATENT DOCUMENTS

| | | | | |
|---|---|---|---|---|
| 2,535,600 A | * | 12/1950 | Rappl | 296/76 |
| 3,004,790 A | * | 10/1961 | Mayer | 296/26.09 |
| 3,216,760 A | * | 11/1965 | Buchwald | 296/76 |
| 3,476,375 A | * | 11/1969 | Brasseur | 267/277 |
| 4,966,403 A | * | 10/1990 | Norstrom | 296/76 |
| 5,195,796 A | * | 3/1993 | Wampler, II | 296/76 |
| 5,533,777 A | * | 7/1996 | Kleemann et al. | 296/117 |
| 5,584,099 A | * | 12/1996 | Westerdale | 16/245 |
| 5,788,312 A | * | 8/1998 | Lee | 296/76 |
| 5,873,619 A | * | 2/1999 | Lewkoski et al. | 296/76 |

FOREIGN PATENT DOCUMENTS

| | | | |
|---|---|---|---|
| FR | 1352179 | * | 1/1964 |
| FR | 1 579 464 | | 8/1969 |

* cited by examiner

Primary Examiner—Stephen T. Gordon
Assistant Examiner—Patricia Engle
(74) Attorney, Agent, or Firm—Kenyon & Kenyon

(57) ABSTRACT

A trunk lid for a convertible vehicle with a folding roof can be opened on the one hand for stowing the folded roof in the trunk and on the other hand to obtain access to the trunk for stowing luggage. The trunk lid is articulated to a part of the bodyshell of the vehicle on one lateral side of the trunk enabling the trunk lid to be opened by rotation from left to right or vice versa.

6 Claims, 2 Drawing Sheets

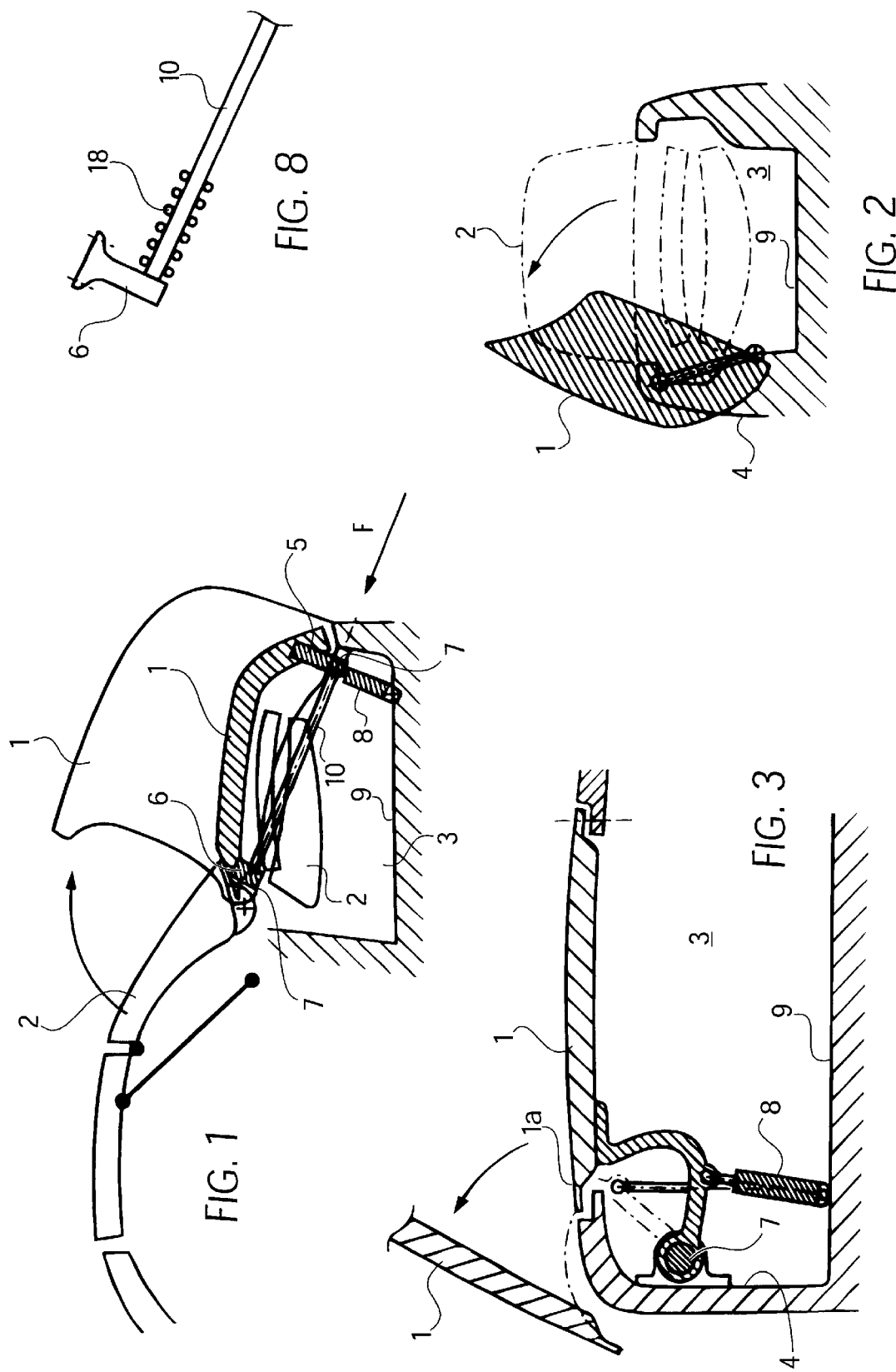

TRUNK LID FOR CONVERTIBLE VEHICLE WITH FOLDING ROOF

BACKGROUND OF THE INVENTION

1. Field of the Invention

The present invention concerns a trunk lid for a convertible vehicle with a folding roof, comprising means for opening the trunk on the one hand for stowing the folded roof in the trunk and on the other hand to provide access to the trunk for stowing luggage.

2. Description of the Prior Art

The trunk lid of an automobile vehicle normally opens from the rear toward the front, which facilitates stowing luggage.

To stow the folded roof of a convertible vehicle it is necessary to be able to open the trunk from the front toward the rear. This is not convenient for stowing luggage, however.

A trunk lid has therefore been proposed which can open from the rear toward the front for stowing luggage and from the front toward the rear for stowing the folded roof of the convertible vehicle.

However, the above solution complicates the construction of the trunk lid.

The aim of the present invention is to create a trunk lid of simple construction and which opens only one way to fulfil both functions optimally, namely stowing the folded roof and stowing luggage.

SUMMARY OF THE INVENTION

A trunk lid in accordance with the invention for a convertible vehicle with a folding roof comprises means for opening the trunk lid on the one hand for stowing the folded roof in the trunk and on the other hand to obtain access to the trunk for stowing luggage and the trunk lid is articulated to a part of the bodyshell of the vehicle on one lateral side of the trunk enabling the trunk lid to be opened by rotation from left to right or vice versa.

In a preferred version of the invention, the trunk lid is connected to said part of the bodyshell by two swan-neck parts one end of which is fixed near one lateral edge of the trunk lid and the other end of which is articulated to a bearing attached to said part of the bodyshell.

The trunk is preferably opened by an electric or hydraulic actuator.

In an advantageous version of the invention, the trunk lid is opened by an electric actuator attached to one of the swan-neck parts and a part of the bodyshell adjacent the bottom of the trunk.

Other features and advantages of the invention will become more apparent in the following description.

BRIEF DESCRIPTION OF THE DRAWINGS

In the accompanying drawings, which are given by way of non-limiting example:

FIG. 1 is a diagrammatic view partly in longitudinal section of a vehicle having a trunk lid in accordance with the invention;

FIG. 2 is a rear view of the trunk lid in accordance with the invention;

FIG. 3 is a view in the direction of the arrow F in FIG. 1 showing the articulation and balancing system end-on;

FIG. 8 shows a detail of the articulation.

DETAILED DESCRIPTION OF THE PREFERRED EMBODIMENT

Figure 6:
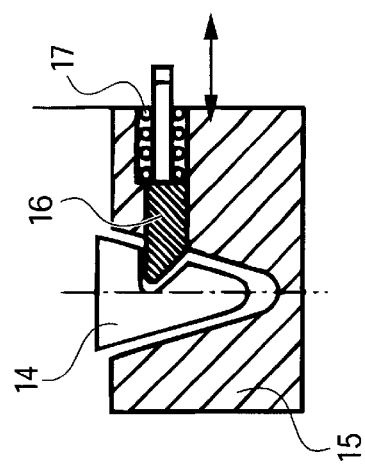
FIG. 6 is a view in section on the section plane A in FIG. 5.

Referring to FIG. 1, the trunk lid 1 of a convertible vehicle with folding roof 2 comprises means for opening the trunk lid 1 on the one hand for stowing the folded roof 2 in the trunk 3 and on the other hand to obtain access to the trunk 3 for stowing luggage.

In accordance with the invention, the trunk lid 1 is articulated to a part 4 of the bodyshell of the vehicle on one lateral side of the trunk 3 enabling the trunk lid 1 to be opened by rotation from right to left or vice versa, as shown by FIGS. 2 and 3 in particular.

In the example shown, the trunk lid 1 is connected to the part 4 of the bodyshell by two swan-neck parts 5, 6 one end of which is fixed near one lateral edge 1a of the trunk lid 1 and the other end of which is articulated to a bearing 7 attached to the part 4 of the bodyshell.

The above articulation system can be complemented (see FIG. 8) by a spring 18 or any other compensator-actuator type system to balance the trunk lid.

The trunk lid 1 is opened by an electric or hydraulic actuator 8.

In the example shown, the electric actuator 8 is attached to one of the swan-neck parts 5 and to a part of the bodyshell adjacent the bottom 9 of the trunk 3.

As shown in FIG. 1, the two swan-necks 5, 6 are connected to each other by a shaft 10 that maintains the trunk lid 1 in torsion.

The trunk lid 1 is held closed by a latch 11 on the opposite side to the articulation of the trunk lid or at the rear of the vehicle.

The latch 11 is actuated by a pushbutton 12 accessible from the outside.

The pushbutton 12 commands unlocking of the latch 11 mechanically via a cable 13 or electrically and simultaneously commands operation of the electric actuator 8 to open the trunk lid.

Figure 5:
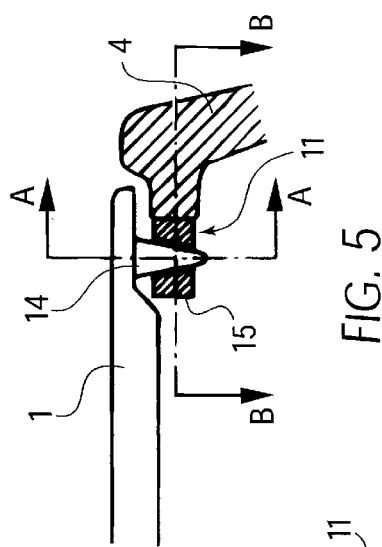
FIG. 5 shows a detail of the locking mechanism.

The latch 11 comprises a self-centering member 14 attached to the trunk lid 1 which engages in a housing 15 attached to the bodyshell 4 (see FIG. 5).

Figure 7:
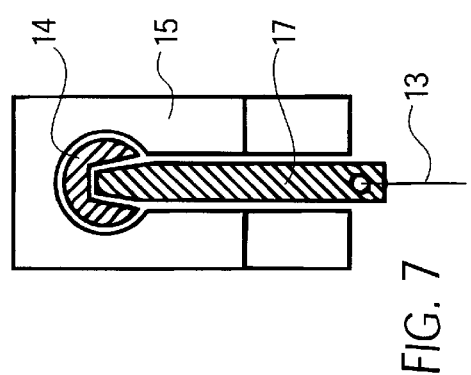
FIG. 7 is a view in section on the section plane B in FIG. 5.
Figure 4:
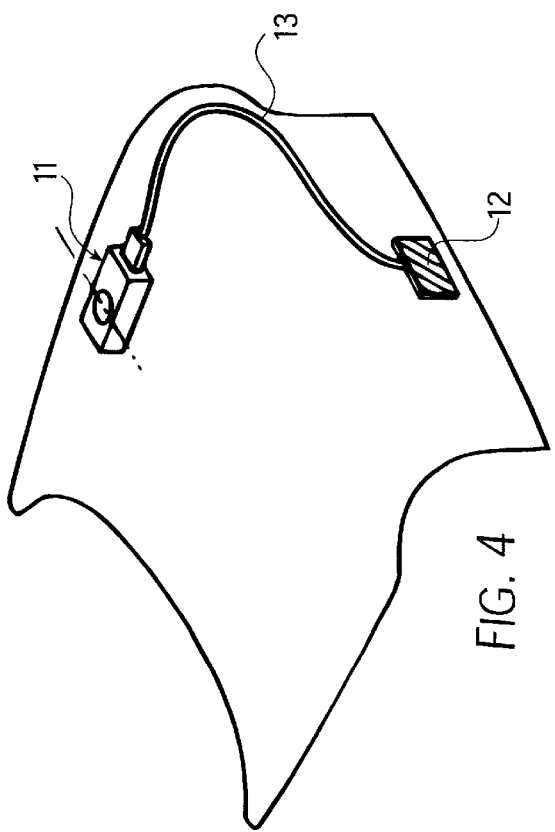
FIG. 4 is a perspective view showing the locking mechanism.

The self-centering member 14 actuates a finger 16 sliding in translation and a spring 17 that immobilizes the trunk lid 1 (see FIGS. 6 and 7).

The operation of the trunk lid just described will now be explained.

To obtain access to the trunk of the vehicle, the user unlocks the latch 11 by pressing the pushbutton 12 and raises the trunk lid 1 (in the manual version), the trunk lid pivoting to the side. This movement is assisted by the actuator 8.

In the electric version, the pushbutton 12 operates the latch 11 and the electric actuator 8 simultaneously.

To stow the roof 2 in the trunk, the trunk lid 1 is actuated in the same way as previously in the manual version and by a button inside the vehicle in the electric version.

Of course, the invention is not limited to the embodiment just described to which many modifications can be made without departing from the scope of the invention.

There is claimed:

1. A single trunk lid in combination with a convertible vehicle having a folding roof, comprising means for opening the single trunk lid on the one hand for stowing the folding roof in the trunk and on the other hand to obtain access to said trunk for stowing luggage, wherein said single trunk lid is articulated to a part of a bodyshell of said vehicle on only one lateral side of said trunk enabling said single trunk lid to be opened by rotation from an opposite lateral side of said trunk toward said one lateral side one lateral side of said trunk, wherein said trunk lid is connected to said part of said bodyshell by two swan-neck parts one end of which is fixed near one lateral edge of said trunk lid and the other end of which is articulated to a bearing attached to said part of said bodyshell and wherein said swan-necks are connected together by a shaft that maintains said trunk lid in torsion.

2. The trunk lid claimed in claim 1 wherein said trunk lid is opened by an electric or hydraulic actuator.

3. The trunk lid claimed in claim 2 wherein said trunk lid is opened by an electric actuator attached to one of said swan-neck parts and a part of said bodyshell adjacent the bottom of said trunk.

4. The trunk lid claimed in claim 1 adapted to be held closed by a latch on the side opposite said articulation or at the rear of said vehicle.

5. The trunk lid claimed in claim 4 wherein said latch is operated by a pushbutton.

6. The trunk lid claimed in claim 5 wherein said pushbutton controls electrical unlocking of the latch and operation of an electric actuator that opens said trunk lid.

* * * * *